July 20, 1965  A. T. RACE, JR  3,195,563
PIPE SYSTEM WITH MOVABLE LATERAL LINES
Filed June 14, 1962  6 Sheets-Sheet 1

INVENTOR
Austin T. Race, Jr.
BY Mason, Fenwick & Lawrence
ATTORNEYS

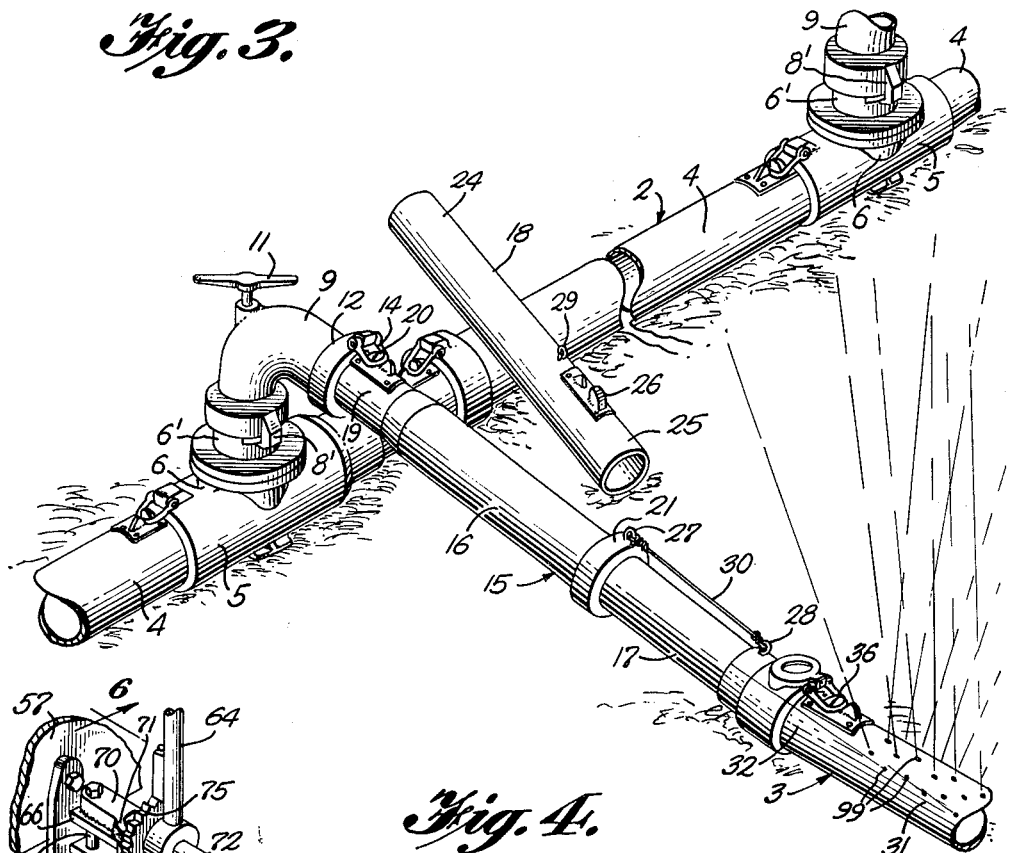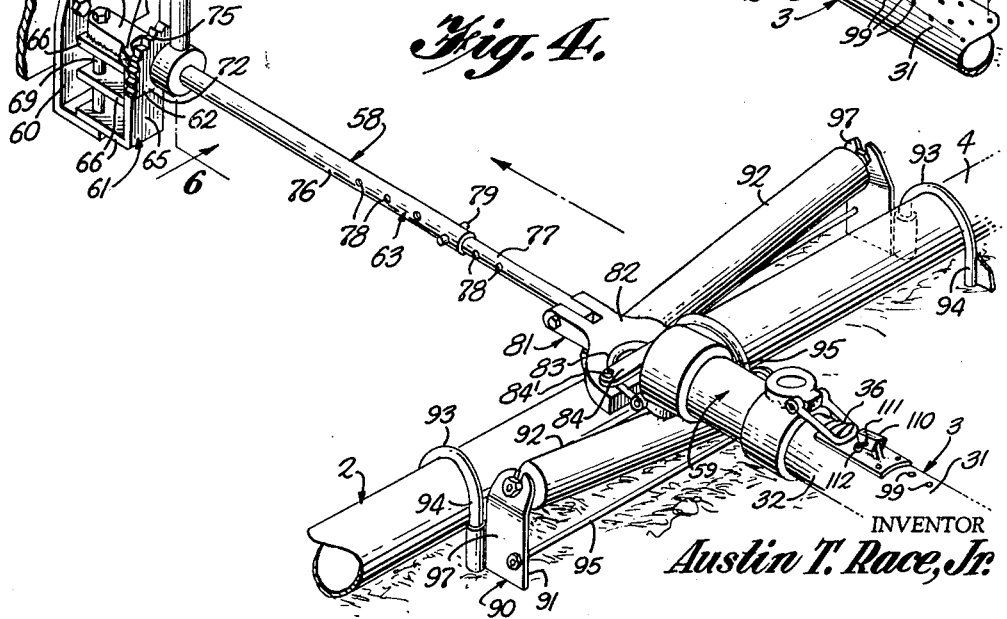

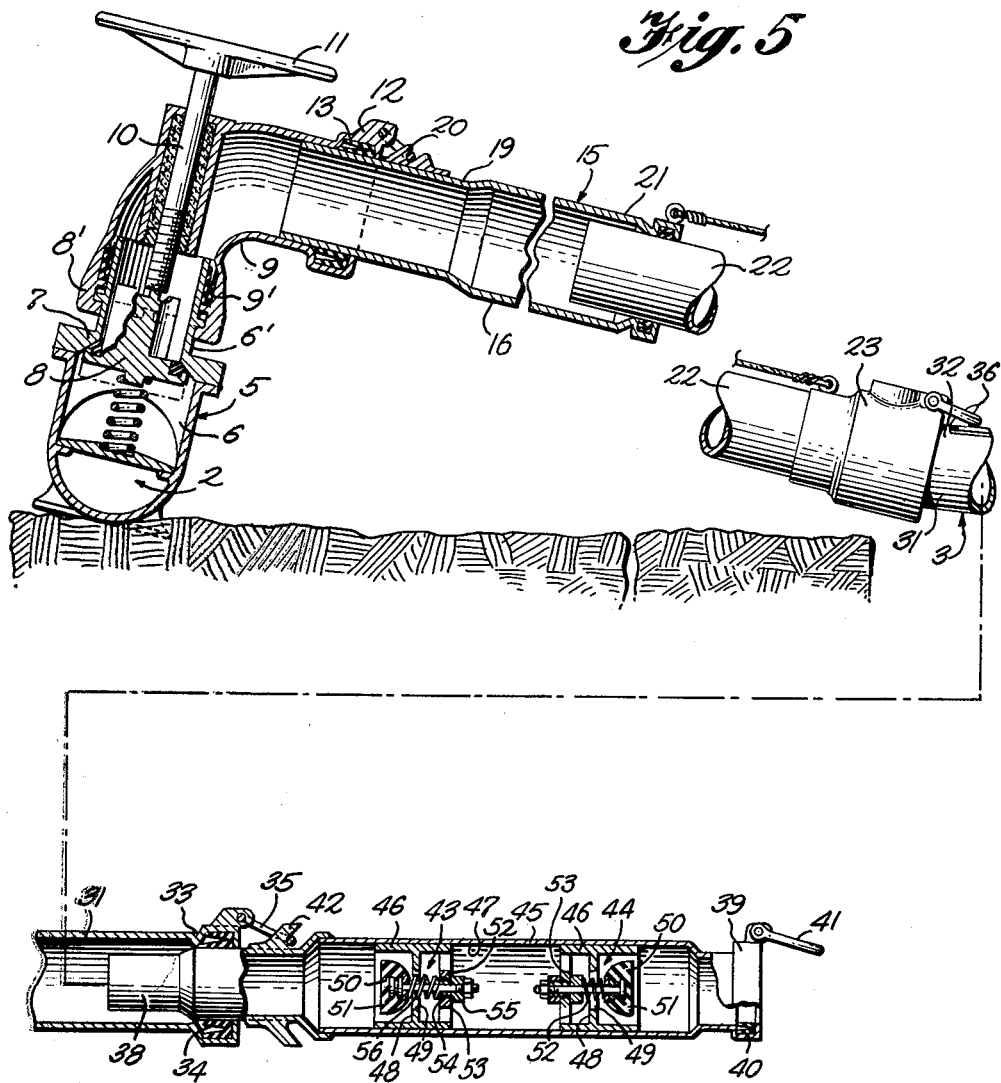

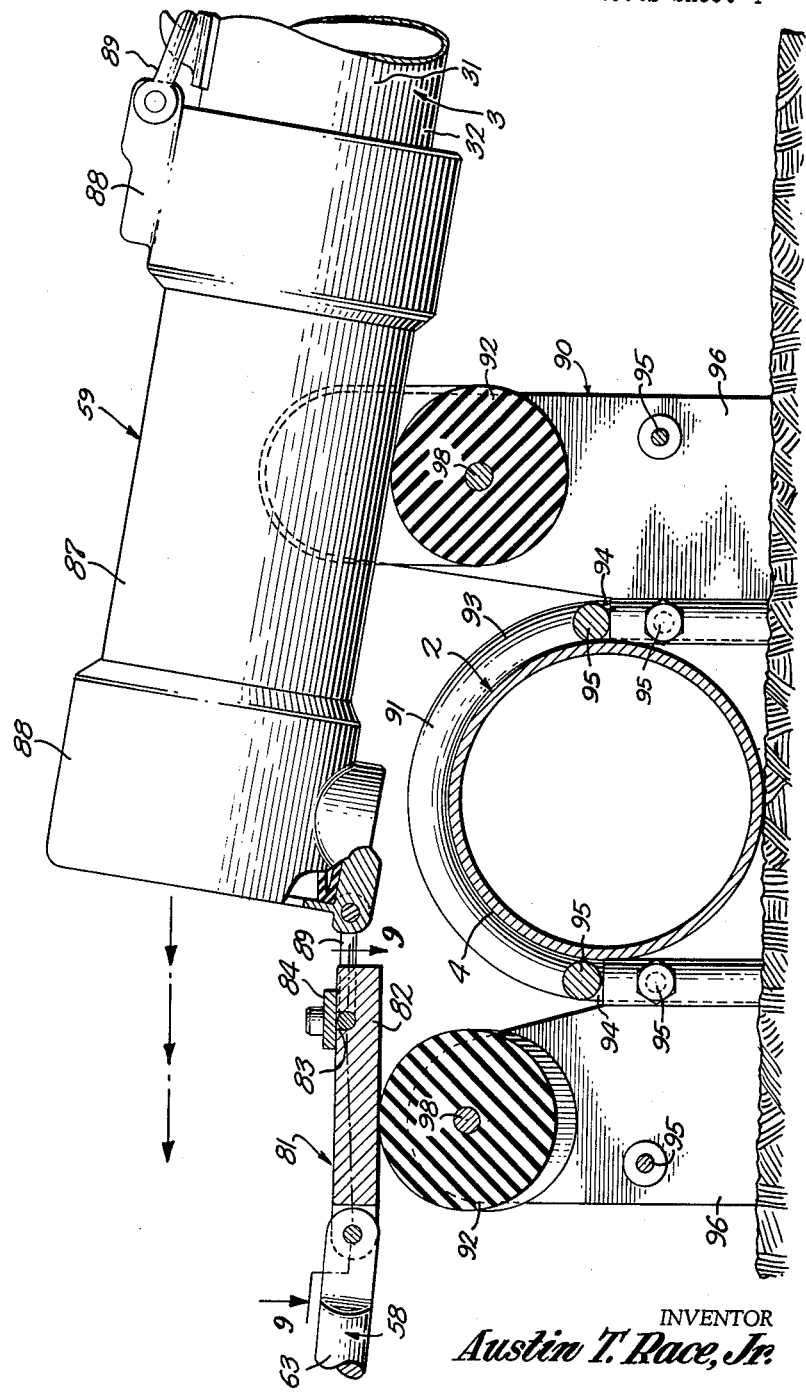

July 20, 1965   A. T. RACE, JR   3,195,563
PIPE SYSTEM WITH MOVABLE LATERAL LINES
Filed June 14, 1962   6 Sheets-Sheet 5
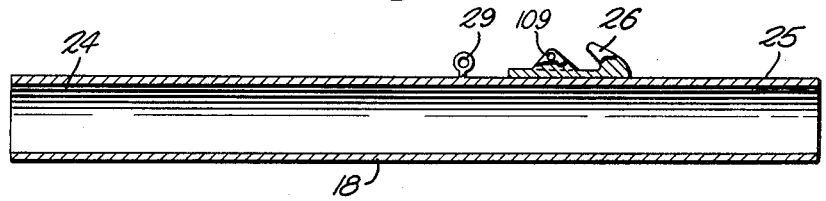
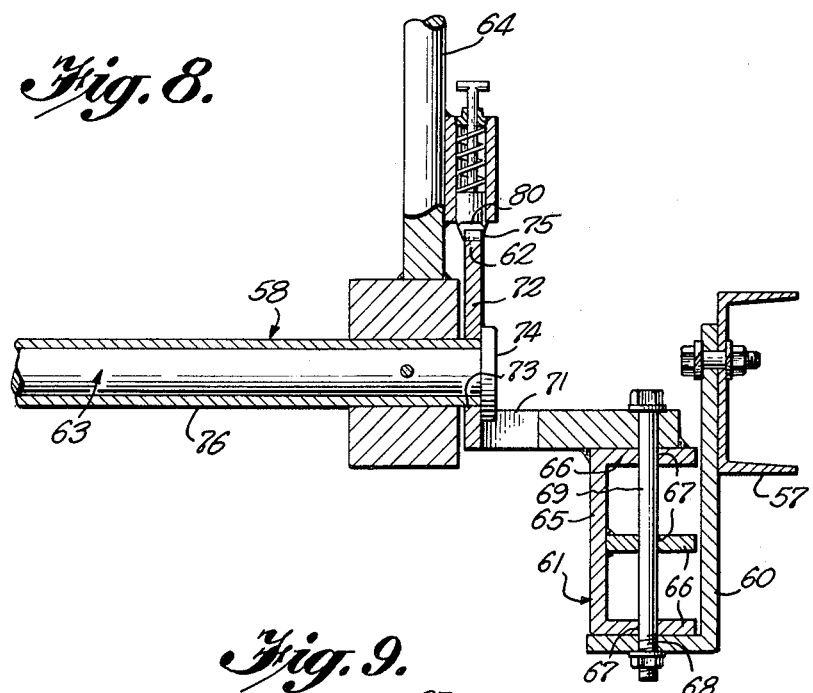
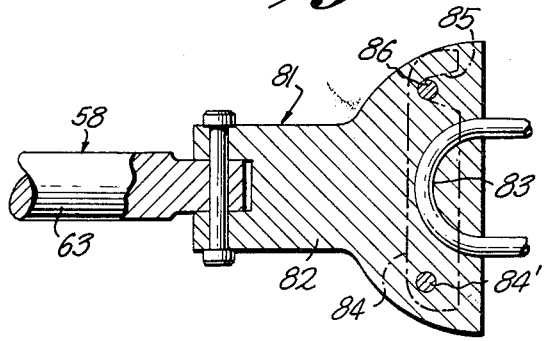
INVENTOR
*Austin T. Race, Jr.*
BY *Mason, Fenwick & Lawrence*
ATTORNEYS

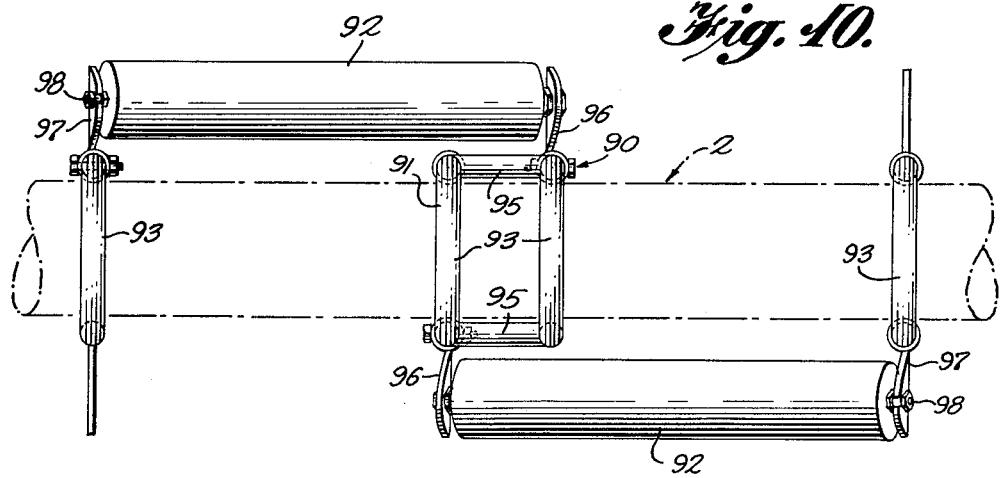
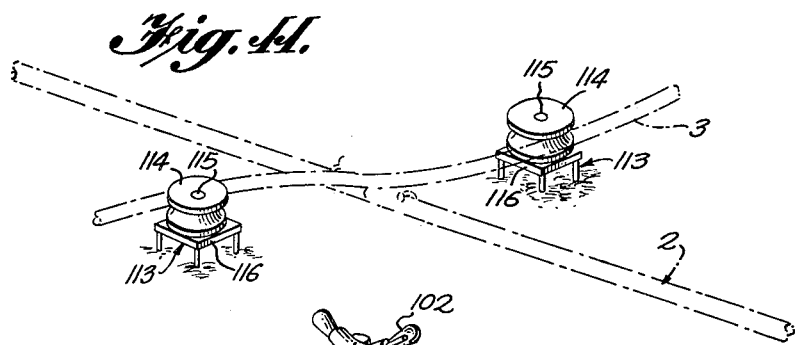
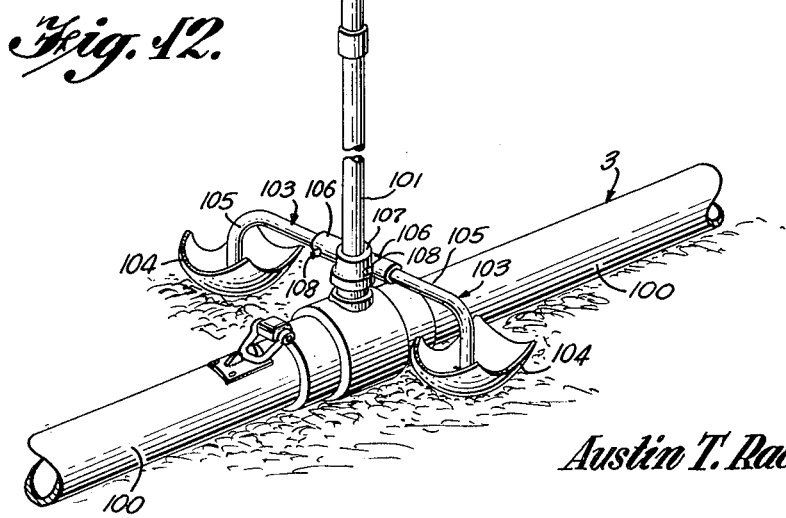

United States Patent Office 3,195,563
Patented July 20, 1965

1

3,195,563
PIPE SYSTEM WITH MOVABLE LATERAL LINES
Austin T. Race, Jr., Winter Haven, Fla., assignor to Race & Race, Inc., Winter Haven, Fla., a corporation of Florida
Filed June 14, 1962, Ser. No. 202,630
7 Claims. (Cl. 137—343)

This invention relates broadly to irrigation through the use of pipe lines, and particularly to an improved irrigation pipe system, an improved method of operating irrigation pipe systems, and improved structural units forming parts of the improved system.

For some years, portable pipe systems have been used for irrigation purposes. They permit various sections of a given area to be watered in sequence, by movement of the pipe of the system from one location to another with a predetermined operative period in each section. The systems usually consist of a main line, connected to a well or other source of water supply, and a number of lateral lines extending from the main line and having water spraying means along their full lengths. At least the laterals are composed of sections of pipe having opposite male and female ends, with coupling of two sections of pipe being automatic upon the insertion of the male end of one section into the female end of the next. The pipe is usually lightweight, being made of aluminum, and of considerable length with the sections capable of both coupling and uncoupling from a remote point by a laborer who normally carries, and handles, the pipe from its center. In laying the system, pipes are carried to position and coupled to the line in sufficient numbers to extend the line the required distance. After one section of land has received sufficient water, the workmen must enter the area, usually quite wet and muddy, uncouple the pipe sections, carry them to a new location and recouple the pipes to form lateral lines. This is a time consuming process and working conditions are extremely unpleasant, yet prior to the present invention, no other portable system has been devised, nor other method of operating the system been conceived. The conventional method is costly, and workmen willing to labor under the prevalent conditions are hard to find.

The general object of the present invention is to provide an improved method of handling an irrigation system, to greatly reduce the time required to shift the lateral pipes from one section to another, to drastically reduce the amount of labor required to make the shift, and to eliminate entirely the need for workmen moving about in the wet, irrigated area.

Another object is the provision of an improved irrigation pipe system particularly adapted to use with the new method.

A more specific object of the invention is to provide an irrigation system wherein the lateral lines can be disconnected from a main line and drawn, as integral units, across the main line for recoupling at the other end with the main line.

It is an object of the invention to provide means for coupling a lateral line to a tractor, or other traction vehicle, for hauling the lateral line across the main line, which coupling means will be capable of operation to reorient the pipe sections making up the line after pulling across the main line, to compensate for rotative movement of one pipe section relative to the next due to lost motion in the couplings.

Another object is to provide special coupling members to permit recoupling of lateral lines to the main line after being pulled over the main line irrespective of minor differences in spacing of the lateral line end from the main line.

2

A further object is the provision of an end cap for use on lateral lines, which will connect to either a male or female pipe end, and automatically close when pressure is on the line and open to allow the pipe to drain when pressure is relieved.

Yet another object of the invention is to provide a roller support for placement over the main line to provide a rolling support for lateral lines being drawn over the main line.

A still further object is the provision of means to hold pipe sections against rotative movement when being drawn, so that risers carried by the pipe will remain vertical, both while the pipe is sliding along the ground and when moving over the main line.

It is also an object to provide means about which a lateral line may be drawn to cause the line to shift transversely, so that when completely drawn across the main line the lateral line will occupy a position relative to the main line which is longitudinally removed from its former position.

Other objects of the invention will become apparent from the following description of practical embodiments thereof, when taken in conjunction with the drawings which accompany, and form part of, this specification.

In the drawings:

FIGURE 3 is a perspective view of a section of an improved irrigation system constructed in accordance with the principles of the present invention;

FIGURE 4 is a perspective view of the system with a lateral line disconnected from the main line and being drawn over the main line;

FIGURE 5 is a vertical section through the lateral line when coupled to the main line, as shown in FIGURE 3, parts being broken away;

FIGURE 6 is a similar section with the parts in the position shown in FIGURE 4;

FIGURE 7 is a section through a double male end member used as a substitute for one member of the telescopic connector at the coupling to the main line when the lateral line to be coupled terminates in a female coupling;

FIGURE 8 is a vertical section through the tow bar, taken on the line 8—8 of FIGURE 6;

FIGURE 9 is a section illustrating the connection of the lateral line to the tow bar, taken on the line 9—9 of FIGURE 6;

FIGURE 10 is a top plan view of the cross-over roller assembly;

FIGURE 11 is a perspective view illustrating the method and means used to shift the position of a lateral line longitudinally of the main line while pulling the lateral line over the main line; and FIGURE 12 is a perspective view of a pipe section equipped with a riser.

Figure 1:
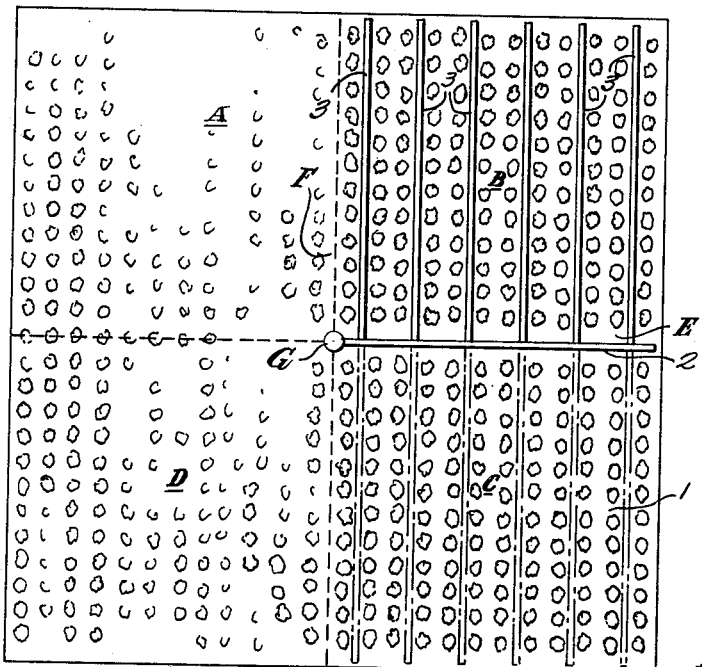
FIGURE 1 is a diagrammatic view of a field, or grove, with an irrigation system laid out on a part of the area, a second position of the lateral lines being shown in dot and dash lines.

Referring first to FIGURE 1, there is a diagrammatic showing of an area under cultivation, either with row crops or fruit trees. Although the method and the irrigation equipment can be used in areas of all shapes, for purposes of simplicity of disclosure a generally square area, similar to a ten acre square, has been shown.

The area 1 is divided into four sections A, B, C, D by center lines which can be wide aisles E and F. A well, or other source of water, G is located at the center of the area, and a main water line 2 extends from the well along one of the aisles, transversely of the growth rows.

Lateral lines 3 are connected into the main line at spaced points therealong, to extend along the rows of growth in one of the area sections adjacent the main line, for example the section B. The lateral lines are arranged so that growth in all rows in the section will be watered during an irrigation operation.

In general terms, the method of the present invention contemplates the handling of the lateral lines as units in transferring from the section B to the section C. the lateral lines are disconnected in succession from the main line, and, when disconnected, coupled to a tractor and drawn as units over the main line and between the growth rows in the section C. When the far end of a line crosses over the main line, that end, which was formerly the free end of the line, is then coupled to the main. When each line has been drawn over the main line and reconnected, the system will be ready for operating use in section C. After the section C has received the desired amount of water, the system can be set up for use in section A, for example, and the laterals later drawn over into section D to complete the coverage of the entire area.

In order to use this method, which will be described in detail, it is necessary that an improved irrigation system, and certain additional apparatus be provided.

The improved system includes a main line 2 composed of a plurality of pipe sections 4, of known design, and a plurality of T riser valve sections 5, coupled between adjacent pipe sections. The pipes 4 and valve sections 5 each have male and female ends, with the male end of one element inserted into the female end of the next. The female coupling ends contain gaskets, not shown, which automatically seal about the inserted male end of the next section to make a watertight joint in well known fashion.

The specific valve structure is not important, as long as it will cut off flow through the valve and its free end is swivelly connected to the body of the section, so that the free end may be swung from one side of the main line to the other.

The valve shown includes a valve body 6 having an apertured partition 7. A valve 8 is slidably mounted in the body and spring biased to aperture-closing position. The valve body terminates at its top in an upstanding tube 6' upon which a take off L 9 is slipped. The L carries a sealing gasket 9' for sealing contact with the tube 6'. The valve body and L are intercoupled by a lug and fin connection 8' which holds the L firmly fixed to the valve body, yet permits the L to swivel freely, so that it can be turned to extend from either side of the main line. The L carries a valve operator which consists of a threaded rod 10 working in a threaded boss 10' for bearing contact with the valve 8. A handle 11 is connected to the rod, outside the L, to facilitate operations of the valve. The L termimates in a female coupling end 12 in which is seated a sealing gasket 13. The L carries a locking link 14, pivotally attached to the upper surface of the female coupling end.

A telescopic coupler 15 is used between each take-off valve and the lateral line connected to it. The coupler is a three part unit, having a body member 16 for constant connection to the valve L, and interchangeable adapter members 17 and 18 for use when connecting to lateral pipe strings presenting female and male sections respectively.

The body member 16 is a tubular pipe section having a male end 19 for insertion in the female coupling 12 of the take-off L of the valve. When inserted, the gasket 13 will embrace and seal around the male end. A locking lug 20 on the male end will receive the link 14 to hold the body member against accidental separation. The particular locking coupling shown is of the general type shown in the patent to Ames, No. 2,188,587, issued January 30, 1940. The opposite end of the body member has a female coupling 21, similar to the coupling member 12 on the take-off L.

The adapter 17 is to be used with the body member 16 when a lateral line presenting a male end is to be coupled to the valve. It has a plain male end 22 at one end and a female coupling 23 at the other. The male end slides into the female coupling 21 of the body member. The male end 22 is sufficiently long to allow for considerable telescopic movement of the adapter relative to the body member while maintaining sealing contact between the two. This will permit compensation for variations in distance between the adjacent end of a lateral pipe to be coupled to the main and the end of the body member 16 of the telescopic coupler.

The adapter element 18 is used as a substitute for adapter 17 when the lateral to be connected presents a female end. This adapter element is a double male end unit, having the telescoping male end 24 for insertion into the body member 16, and a conventional male end 25 for connection to the female end of a lateral line. The conventional male end 25 has the usual locking lug 26 for engagement by the lateral line locking link in usual fashion.

It has been found that in normal use with relatively long lateral lines, there is little likelihood of the adapter blowing out of the body member of the telescopic coupler. However, the body member 16 may be provided with an apertured ear 27 at the female coupling end, and the adapters 17 and 18 may have apertured ears 28 and 29, at the ends 21 and 25, respectively. A cable, or wire 30, may be fastened to the ear 27 of the body member and the ear of the particular adapter being used to positively prevent separation of the telescopic unit, if desired.

Lateral lines 3 are composed of a plurality of coupled pipe sections 31, each having a male end 32 and a female end 33. A sealing gasket 34 is seated in each female end. The female ends carry locking links 35, and the male ends have locking lugs 36, so that the sections can be locked together. The pipe sections are generally similar to the sections disclosed in the above mentioned patent to Ames, No. 2,188,587. The pipe sections are usually from twenty to forty feet in length, and light-weight so that they can be carried by one man. Enough sections will be coupled and locked together to make lateral lines of desired length.

The lateral lines will have their ends farthest removed from the main line closed by means of end closure units. These are short lengths of pipe having a male end 38 and a female end 39. The female coupling has a sealing gasket 40. The two ends are provided with a locking link 41 and a locking lug 42. Within the unit, there are two valves 43 and 44, which are spring biased to open position, and closed by water pressure in the line. The valves are oppositely positioned, so as to be operative under water pressures from opposite directions.

The valves are formed as separate assemblies, and placed as units within the closure member before the male and female ends are joined to the central section 45 of the member. Each valve consists of a mounting sleeve 46, having a cylindrical side wall 47 and a partition 48 with a central aperture 49. The aperture is closable by a check valve 50. The valve has a head 51 and stem 52. A bridge 53 across the cup walls, below the partition, has a central opening 54 with an upstanding boss 55, forming a bearing through which the valve stem slides and the valve head moves to and from valve-closing position. A spring 56 is coiled around the stem between the valve head and the bridge 53 to urge the valve head from seating position. The valve heads are flat to provide broad surfaces against which water may impinge to press the valve to closed position. It will be clear that no matter which end of the closure is connected to a pipe line, water entering that end will strike the flat top of the valve at that end and close it. When water pressure drops, the valve will open and the line can drain.

As mentioned above, it is contemplated that entire lateral lines will be drawn across the main line in moving the system from one area to another. For this purpose, a tractor 57, or other suitable towing vehicle will be used. The pipe lines, after being disconnected from the main at the telescopic connection, as will be described, is hitched to the tractor by means of a tow bar 58, and a converter 59 when required. The tow bar will be connected to a conventional draw bar 60 at the back of the tractor.

The tow bar consists of a mounting bracket 61, an angle adjusting quadrant 62, an extensible bar 63 and an operating handle 64.

The mounting bracket is provided to permit vertical adjustment of the tow bar relative to the draw bar of the towing vehicle, so that no downward thrust will be imposed upon pipe being drawn over the main line. The bracket includes a vertical back member 65, having three vertically spaced, parallel, forwardly projecting mounting tongues 66. By placing a selected one of the tongues 66 upon the draw bar 60, the height of the tow bar can be controlled. The several tongues have aligned openings 67, and the draw bar has an opening 68 to receive a draft pin 69 to pivotally connect the bracket and draw bar.

The extensible bar 63 is rotatably connected to the mounting bracket by means of a yoke 70, having arms 71 extending rearwardly from the bracket and joined by a bridge 72. The bridge is apertured, as at 73, to provide a journal for the rod. A collar 74 on the end of the rod between the arms of the yoke holds the rod against withdrawal. The top of the bridge is arched and toothed, as at 75, to form the quadrant 62.

The extensible bar can be in two or more telescoping sections 76 and 77, provided with aligned openings 78 to receive an adjusting pin 79 to hold the sections in selected positions of adjustment. Operating handle 64 is attached to rod 63 closely adjacent the bridge 72 of yoke 70. The handle will rise to a height convenient to the tractor operator so that he may swing it from side to side to rotate the pipe string being moved, as will be described. A conventional latch dog 80 will be carried by the handle for cooperation with the quadrant 62 for holding the handle at selected angles of adjustment.

In order for the tow bar to have rotative control over the towed pipe string, it is necessary that the tow bar be connected to the string by a non-rotatable connection. Such a connector 81 is provided at the end of the extensible rod. The connector comprises a plate 82 having a recess 83 therein of such shape that it will receive a locking link 35 on the female coupling end of one of the pipe sections of the lateral line. The link will seat within the U-shaped recess 83 and be flush with the upper surface of plate 82. A latch link 84 has one end pivotally connected, as at 84', to plate 82 at one side of recess 83, and is sufficiently long to bridge the recess to overlie a link therein and prevent its removal. The free end of latch link 84 is slotted, as at 85, to fit over a pin 86 projecting upwardly from the plate at the opposite side of the recess from the pivot. Latch link 84 will have a snug friction fit on pin 86 to hold the latch against release. This connection with the pipe string will cause the string to rotate when the tow bar rod is rotated, and prevent rotative movement of the pipe section clamped to the connector when the tow bar rod is held against rotation.

The above described connector may be coupled directly to the female coupling 33 of the end pipe section of a lateral line if a female coupling is at the end. If, however, the pipe line terminates in a male end it will be necessary to use the converter 59. This is a short pipe length 87 having female couplings 88 at each end. At each coupling there is a locking link 89. It will be noted that the link positions are reversed at the opposite ends, so that when the connector is slipped on the male end of a pipe section and the locking link 89 at that end dropped over the locking lug 36 on the male end, the locking link 89 at the other end of the converter will be at the bottom. Therefore, when the free link is attached to the tow bar connector 81 the pipe line will be raised, and there will be no part of the connector below the level of the tow bar. This will be true irrespective of which end of the connector is coupled to the pipe line.

In order to insure a smooth passage of the lateral line across the main line, a roller cross-over 90, shown in FIGURES 4, 6 and 10, is used. This consists of a base 91 which straddles the main line and supports rollers 92 over which the pipe is drawn. The base may take any convenient form, and is shown as consisting of a plurality of spaced arch-shaped legs 93 of sufficient size and so shaped that they will fit over the main pipe line with their feet 94 resting upon the ground on opposite sides of the main line. The central arched legs are held in proper spaced relation by means of spacer rods 95. The central arched legs will carry short roller-supporting castings 96, and the end legs will carry longer castings 97. Additional spacer rods 95 hold the castings properly spaced. By using short central castings, rollers 92 will be inclined so that their inner ends, that is the ends near the center of the cross-over, will be lower than their outer ends. Roller shafts 98 will be journalled in the castings. It will be clear from FIGURES 4, 6 and 10, that the inner supports for the rollers are on opposite sides of the center of the cross-over so that the rollers overlap and form a V-shaped cradle in which the pipe rides. This will provide a centering action to maintain the pipe at the center of the cross-over, and, at the same time, the pipe will be free floating and varying diameters of pipe will be accommodated by the cross-over. The incline of the rollers will hold the pipe against dropping off the side of the cross-over.

The lateral pipe lines may be made up of pipe of either of two kinds, a perforated pipe as shown in FIGURES 3, 4, 5 and 6, or a pipe having risers, as shown in FIGURE 12. The first type will simply have holes 99 drilled in predetermined pattern to provide the desired spray.

The pipe 100, shown in FIGURE 12, is provided with risers 101, threaded into the pipe in conventional manner, with spray heads 102 at the top. Due to rotational play between pipe sections permitted by the loose fit of the locking links on the locking lugs, pipe having risers is subject to side tilt, particularly when being pulled in transferring from one area to another. As that rotational play along the line is cumulative, the risers on pipe sections removed from the connected end could fall to the ground with the likelihood of breakage during transfer and, of course, the difficulty of proper alignment for use.

In order to maintain the risers truly vertical, outriggers 103 are provided. These are in the form of skis, or sleds, 104 curved both longitudinally and transversely for smooth movement over the ground and over the rollers of the cross-over. The skis are attached to arms 105 mounted in sleeves 106 on a collar 107. The collar is fixed immovably to the riser. The skis may be moved laterally to adjust the distance between them, by sliding the arms different distances in and out of the sleeves 106 and holding them in positions of adjustment by set screws 108.

Although the locking lugs and links coupling the pipe sections together hold the sections securely, even while the pipe lines are being drawn over the main line, it may be desired to lock the link in place to prevent accidental release. This can be done by providing the locking lugs with openings 109 and placing a U-shaped clip 110 over the lug to project into the path of releasing movement of the locking link. The clip will have openings 111, and a retaining pin 112 can be inserted through the openings 111 and 109 to mount the clip on the lugs.

Figure 2:
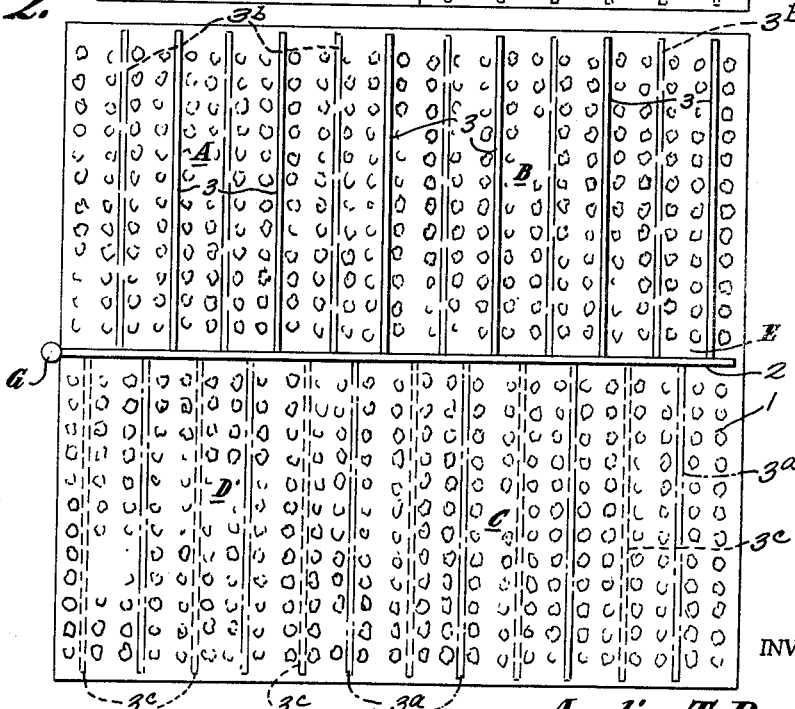
FIGURE 2 is a diagram of a similar area with a different arrangement of irrigation pipes, having second, third and fourth positions of the lateral pipes indicated.

In FIGURE 2, there is shown a diagram in which the main line 2 extends the full length of the field from a well G located outside the area to be irrigated. Lateral lines 3 are connected to the main so as to lie along each second row or predetermined spacing in one-half of the field, or grove. By pulling the lines across the main and, at the same time, shifting the lines laterally of the field, they can be coupled again to the main in positions indicated as 3ª. This procedure can be repeated to bring the pipes back into the first section straight across the main to occupy positions 3ᵇ, and then back to the second section at a further laterally shifted position, as at 3ᶜ. Thus, the entire area can be irrigated with relatively few lateral lines and without uncoupling any of the lines.

It is necessary to provide guide members for the pipe if it is to be shifted laterally as the line is drawn across the main line. The positions of the guides to produce the required lateral shifting is shown diagrammatically in FIGURE 2. There is sufficient flexibility in the pipe sections to allow the pipe to make the direction changes required to shift from one row to the next.

A guide 113, suitable for the purpose, is shown in FIGURE 11. It consists essentially of a grooved roller 114 mounted upon a shaft 115 supported in a base 116. The pipe line can be laid in the groove of the roller and will track to make the required turn as it is drawn along.

In the use of the system and practicing the method of the present invention, a main line provided with a plurality of T riser valves 5 will be laid in accordance with a predetermined plan, and a number of lateral lines connected to desired take-off valves as required. This can provide a lay-out similar to those shown in FIGURES 1 and 2, or it can be any desired arrangement. After the system has been in use irrigating the section in which the laterals are first laid, and sufficient water has been put upon the land, the several lateral lines can be disconnected from the main line and drawn over the main line for use in an adjacent section.

When a change over is to be made, the valve 5 at the first line to be moved is closed by rotating the handle 11. As soon as the valve is closed, pressure drops in the lateral line and the valve 46, which was closed, will open under spring pressure and allow the line to drain. Draining of the line serves no function other than reducing the line weight and making it possible to uncouple the link from the main line without excess water pouring out.

After valve 5 is closed, the adapter member 17 or 18, as the case may be, of the telescopic coupler is uncoupled from the first pipe section of the string by releasing the locking link from the lug, and the adapter is telescoped into the body member 15 to slide it from the first pipe section. This leaves the lateral line free from the main line.

If the freed end of the line terminates in a male end, the converter 59 is slipped on the end and locked in place. A tractor, or other vehicle, having the tow bar 58 attached is backed to the line end and the locking link 89 at the free end of the converter is placed in the recess 83 of the connector plate 82 at the end of the tow bar. Latch link 84 is swung to latched position and the lateral line is coupled to the tractor.

It was mentioned above that the pipe sections of the string have some rotative movement relative to one another and rotation will occur as the line is pulled. This movement is always in one direction. Therefore, the tow bar handle 64 is moved to the direction opposite normal rotative movement of the sections so as to take the play out of the line. The handle is moved only enough to take up the lost motion, and the pipe sections of the string farthest removed from the towing vehicle will still be properly oriented with its spray openings 99 in the upper exposed section of the pipe.

The cross over 90 is placed over the main line adjacent the valve. This is usually done before the line is coupled to the tow bar so that the tractor can be backed to the cross over to be properly positioned to draw the line across the cross over. The freed end of the lateral line can be moved to the side easily the distance needed to align it with the cross over.

The tractor will start and the entire pipe string will be drawn over the main line, passing over the rollers of the cross over. The V-trough formed by the rollers will provide a guide to maintain the line in proper position. Normally a stake, or marker, will be placed at the proper position for the tractor to stop when the drawn line has cleared the main line. This is required due to the great length of line being moved.

During the pulling of the lateral line, the swivelled L of the valve 5 and the connected telescopic coupler 15 are turned to extend to the opposite side of the main line. As soon as the lateral line has cleared the main line, the telescopic adapter is removed from the coupler and the other adapter is inserted for the end of the lateral line now to be connected will have an opposite coupler end. The end closure unit 37 is removed from the line end and the telescopic adapter is attached in its place. The fact that a telescopic coupler is used, not only makes it possible to connect to a pipe string which is too long and heavy to shift, but it also permits connection with the pipe end at various distances from the main line.

The tractor operator upon reaching the marker will bring his operating handle 64 back to upright position to rotate the line to re-orient the pipe sections properly, and then release the connection of the tow bar to the line. An end closure member with automatic valves will be connected to the line end.

The reconnected line is now ready for operation in the new area. Opening of valve 5 is all that is required to start the next irrigation cycle.

The lineman, who controls the line valves and couples and uncouples the lateral lines, together with the tractor operator, will then move to the next lateral line and repeat the operation. This will be repeated until all lateral lines have been shifted to the new area.

This method of operating an irrigation system drastically reduces the number of men required to make changes in the area covered. The flow rate may be governed so that the moving of the lines can be done in the morning and in the evening, leaving the workmen free for other jobs during the day. The transfer from one section to another can be done in a fraction of the time formerly required to move the lateral lines, and it can be done without need for the men walking in the muddy, irrigated area.

While in the above one practical embodiment of the invention has been disclosed, it will be understood that the structure shown and described is merely by way of example, and the invention may take other forms within the scope of the appended claims.

What is claimed is:

1. An irrigation system comprising a main line including a plurality of take off valves spaced therealong, each valve including a swivelled take-off member, a plurality of interconnectible pipe sections to form lateral lines, each pipe section having a male coupler end and a female coupler end with the mating ends of the sections intercoupling to form elongated lateral pipe lines, telescopic couplers each having a body member coupling to a take off valve and one of interchangeable male and female adapter sections for coupling to mating lateral line coupler ends and for telescopic union with the body member, an end closure member in each lateral line, a tow bar means connectible to a traction vehicle and rigidly connectible to one end of a lateral pipe line to draw the lateral pipe line across the main line, and a connector having a female coupler at each end for connection to a male end of a lateral pipe line and to the tow bar.

2. A telescopic coupler for interconnecting lateral lines of an irrigation system to a main line comprising, a body member and interchangeable male and female adapter sections each capable of telescopic union with the body member, the body member comprising a pipe length having an open female coupler end with an annular sealing gasket mounted within the coupler end and a male end, the male adapter section comprising a pipe length having one end telescopically slidable within one end of the body member in sealing relation with the gasket in that end of the body member and the opposite end a male fitting for insertion into a female coupler at the end of a lateral pipe line to be connected to a main line, and the female adapter section being a pipe length having one end telescopically slidable within the female end of the body member in sealing relation with the gasket in that end of the body member and the opposite end an open female coupler having an annular sealing gasket mounted therein to receive a male fitting at the end of a lateral pipe line to be connected to a main line.

3. A telescopic coupler as claimed in claim 2 wherein the male fitting on the male adapter section and the female coupler on the female adapter section each have means for locking engagement with a lateral line to be connected, and the male end of the body member has means for locking engagement with the main line to which it is to be connected.

4. A self-draining end closure member for open ends of pipe lines comprising, a length of pipe having an open female coupler at one end for connection to the male end of a pipe line and a male fitting at the other end for connection to the female end of a pipe line, an annular gasket mounted in the female coupler, a pair of apertured partitions spaced longitudinally of the pipe length, and a normally open check valve means associated with each apertured partition, each check valve means being operable by water pressure from the end of the closure member to which it is adjacent to close the apertured partition with which the valve is associated.

5. A self-draining end closure member as claimed in claim 4 wherein the apertured partitions and associated check valve means are units, each unit comprising a sleeve fitted within the pipe length adjacent one end, one of said partitions having a central aperture therein spanning the sleeve, a valve movable into the aperture from the side of the partition adjacent the pipe length end, and a spring normally holding the valve biased away from the partition aperture.

6. A tow bar for connection to a pipe line and a traction vehicle comprising, a mounting element for connection to the traction vehicle, a towing rod rotatably secured to the mounting element for turning movement about its own longitudinal axis, the rod having a free end remote from the mounting element, means on the free end of the towing rod for connection to a pipe line to be drawn, and an operating handle connected to the tow rod by which the tow rod can be rotated.

7. A tow bar as claimed in claim 6 wherein the tow bar has means for holding the tow rod in positions of rotational adjustment.

References Cited by the Examiner
UNITED STATES PATENTS

| | | | |
|---|---|---|---|
| 1,147,292 | 7/15 | Benson et al. | 137—269.5 |
| 1,616,775 | 2/27 | Williams | 137—517 |
| 2,146,893 | 2/39 | Gotthardt | 193—35 X |
| 2,389,887 | 11/45 | Baxter et al. | 137—517 |
| 2,484,407 | 10/49 | Greenbaum | 285—302 |
| 2,499,048 | 2/50 | Yager | 285—5 |
| 2,582,416 | 1/52 | Cornelius | 137—344 |
| 2,642,311 | 6/53 | Beyer | 239—1 |
| 2,647,533 | 8/53 | Beymer | 137—517 |
| 2,678,221 | 5/54 | Kohlsaat et al. | 280—292 |
| 2,765,806 | 10/56 | Webster | 137—322 |
| 2,789,009 | 4/57 | Maraccini | 239—1 |
| 2,789,832 | 4/57 | Zumwalt | 280—292 |
| 2,881,842 | 4/59 | Wilson | 285—302 |
| 2,892,466 | 6/59 | Stilwell et al. | 137—344 |
| 2,910,835 | 11/59 | Timothy | 193—35 X |
| 2,912,996 | 11/59 | Moulton | 137—344 |

M. CARY NELSON, *Primary Examiner.*

ROBERT A. O'LEARY, *Examiner.*